United States Patent [19]

Papazoglou

[11] Patent Number: 5,216,075
[45] Date of Patent: Jun. 1, 1993

[54] IMPACT RESISTANT POLYBLENDS OF POLYAMIDES, ACID COPOLYMERS AND ANHYDRIDE FUNCTIONALIZED ELASTOMERS

[75] Inventor: Elisabeth S. Papazoglou, West Chester, Pa.

[73] Assignee: Arco Chemical Technology, L.P., Wilmington, Del.

[21] Appl. No.: 518,898

[22] Filed: May 4, 1990

[51] Int. Cl.$^5$ .............................................. C08L 77/00
[52] U.S. Cl. ........................................ 525/66; 525/179
[58] Field of Search .................... 525/66, 179

[56] References Cited

U.S. PATENT DOCUMENTS

| | | | |
|---|---|---|---|
| 4,174,358 | 11/1979 | Epstein | 525/183 |
| 4,421,892 | 12/1983 | Kasahara et al. | 524/514 |
| 4,427,828 | 1/1984 | Hergenrother et al. | 526/66 |
| 4,429,076 | 1/1984 | Saito et al. | 525/57 |
| 4,528,326 | 7/1985 | Dean | 525/66 |
| 4,593,066 | 6/1986 | Dean | 525/66 |
| 4,657,970 | 4/1987 | Shiraki et al. | 525/57 |
| 4,777,211 | 10/1988 | Lavingood et al. | 525/66 |
| 4,795,782 | 1/1989 | Lutz et al. | 525/66 |

FOREIGN PATENT DOCUMENTS

| | | |
|---|---|---|
| 277381 | 10/1988 | European Pat. Off. |
| 3604348 | 8/1987 | Fed. Rep. of Germany |
| 3604376 | 8/1987 | Fed. Rep. of Germany |
| 56-112957 | 9/1981 | Japan |
| 57-025355 | 9/1982 | Japan |
| 63-66249 | 3/1988 | Japan |

OTHER PUBLICATIONS

D'Orazio et al. [Polymer Eng. Sci.] 24(i), 48(1984).
Borggreve et al. [Polymer 28, 1489(1987)].
Jpn. Kokai 81-62, 844 (Abstract Only; C.A.95, 133855r).
Ger. Offen. DE 3,120,803 (Abstract Only; C.A.98 90535d).
Ger. Offen. DE 3,444,435 (Abstract Only; C.A.105, 80053u).
Jpn. Kokai 85-210,660 (Abstract Only; C.A.104, 130923e).

Primary Examiner—Ana L. Carrillo
Attorney, Agent, or Firm—Stephen D. Harper

[57] ABSTRACT

Moldable multi-phase polyblends having excellent impact properties are disclosed which comprise blends of a polyamide, a thermoplastic copolymer of an $\alpha,\beta$-unsaturated carboxylic acid and a monovinyl aromatic monomer, and an anhydride-functionalized elastomer. The functionalized elastomers are low in unsaturation, providing polyblends having good oxidative stability, and are $\alpha,\beta$-carboxylic acid anhydride adducts of EPDM-type rubbers, hydrogenated block or random copolymers of monovinyl aromatic monomers and conjugated dienes, or hydrogenated polymers of conjugated dienes. Optimum impact properties are achieved by combining the components of the polyblends using particular melt-blending procedures.

8 Claims, No Drawings

IMPACT RESISTANT POLYBLENDS OF POLYAMIDES, ACID COPOLYMERS AND ANHYDRIDE FUNCTIONALIZED ELASTOMERS

BACKGROUND OF THE INVENTION

This invention is directed to multi-phase polyblends of polyamide resins, high molecular weight thermoplastic copolymers containing unsaturated carboxylic acid, and adducts of carboxylic acid anhydrides and elastomeric polymers. The invention additionally relates to a method for the preparation of such thermoplastic moldable polymer blends wherein chemical grafting of the blend components is accomplished.

Polyamide resins have been widely used as thermoplastics in molding applications because of their high resistance to chemicals, heat, and abrasion and their generally good mechanical properties. However, polyamide resins possess certain deficiencies, including shrinkage during molding and high hygroscopicity. The tendency to absorb water results in dimensional stability problems and loss of mechanical strength. Although polyamide resins are fairly tough under most impact conditions, they can be notch-sensitive and brittle at low temperatures. Polyamide resins have been blended with other polymers to compensate for these deficiencies or to enhance mechanical properties such as stiffness and tensile strength.

U.S. Pat. No. 4,528,326 teaches polyblends of polyamide resins having at least seven methylene units separating each amide functional group and rubber-modified styrene/unsaturated carboxylic acid anhydride or imide copolymer resins. Polyblends of polyamides containing fewer than seven methylene units were found to have undesirably low impact strength.

Jpn. Pat. No. 56-112957 teaches polyblends of polyamide resins and rubber-modified styrene copolymer containing high levels of unsaturated carboxylic acid anhydride, with the styrene copolymer preferably also containing an unsaturated carboxylic acid ester in order to minimize the extent of undesired cross-linking during melt-kneading.

U.S. Pat. No. 4,421,892 contains similar teachings regarding polyblends of polyamide resins and styrene copolymers containing high levels of unsaturated carboxylic acid anhydride. Good mechanical strength was only achieved in such polyblends when an unsaturated carboxylic acid ester was additionally present in the styrene copolymer.

Jpn. Pat. No. 57-025355 teaches blends of styrene/maleic anhydride copolymers and polyamides, but does not teach how adequate impact properties may be accomplished with such blends.

Ger. Pat. No. 3,604,348 teaches blends of polyamides, ethylene/acrylate or acrylic acid copolymers, and styrene/acrylic acid or styrene/anhydride copolymers. Similar teachings are found in Ger. Pat. No. 3,604,376 which additionally discloses the use of a conjugated diene polymer or copolymer to improve the impact strength of such blends.

U.S. Pat. No. 4,174,358 teaches the toughening of polyamides by blending with elastomeric polymers bearing functional groups, including anhydride, which may chemically react with the polyamide so as to achieve grafting between the components.

U.S. Pat. No. 4,427,828 teaches the impact modification of polyamides with maleic anhydride adducts of either a hydrogenated polymer of a conjugated diene or a hydrogenated block or random copolymer of a copolymer of a conjugated diene and a monovinyl aromatic monomer.

SUMMARY OF THE INVENTION

In contrast to prior art blends of polyamides and styrene copolymers, the multi-phase polyblends of this invention have an excellent balance of properties. These outstanding properties are obtained without the use of an unsaturated carboxylic acid ester as a third comonomer in the styrene copolymer or a limitation on the type of polyamide resin employed.

The multi-phase polyblends of the present invention exhibit superior stiffness and impact strength and less absorption of moisture relative to the unblended polyamide resins. At the same time, these polyblends retain the other desirable properties of polyamide resins, including high tensile strength and chemical, heat, and abrasion resistance.

It is an object of this invention to obtain moldable multi-phase polyblends having high mechanical strength, high stiffness, high heat distortion temperatures, low moisture absorption, and good impact strength.

It is a further object of the invention to improve the impact properties of blends of polyamides and styrene/unsaturated carboxylic acid copolymers while maintaining a high degree of resistance to oxidative degradation.

According to this invention, there is provided a moldable thermoplastic polymer blend comprising: (A) from about 9 to 94 weight percent of a polyamide having a number average molecular weight of at least about 8,000; (B) from about 5 to 90 weight percent of a thermoplastic copolymer of an $\alpha,\beta$-unsaturated carboxylic acid, a monovinyl aromatic monomer, and optionally, an unsaturated monomer selected from the group consisting of unsaturated carboxylic acid imides, unsaturated carboxylic acid esters, and unsaturated nitriles, said thermoplastic copolymer having a number average molecular weight of at least about 30,000; and (C) from about 1 to 30 weight percent of a functionalized elastomer comprising an adduct of an $\alpha,\beta$-unsaturated carboxylic acid anhydride and an elastomeric polymer selected from the group consisting of: (a) a random copolymer of ethylene, at least one $C_3$ to $C_6$ $\alpha$-olefin, and at least one diene; (b) a block copolymer wherein at least two blocks consist essentially of recurring units of at least one monovinyl aromatic monomer and at least one other block consists essentially of recurring units of at least one conjugated diene, and wherein said other block is substantially hydrogenated such that the unsaturation level of said other block is less than 20 percent of the original unsaturation level; (c) a substantially random copolymer of at least one monovinyl aromatic monomer and at least one conjugated diene, wherein said random copolymer is substantially hydrogenated such that the unsaturation level of said random copolymer is less than 20 percent of the original unsaturation level; and (d) a polymer of at least one conjugated diene, wherein said polymer is substantially hydrogenated such that the unsaturation level of said polymer is less than 20 percent of the original unsaturation level.

DESCRIPTION OF THE PREFERRED EMBODIMENTS

The moldable multi-phase polyblends of this invention are tough rigid thermoplastics having a fine dispersion microstructure observable by electron microscopy. The compositions of the continuous and disperse phases depend on the relative amounts of the blend components employed. The disperse phase when viewed by electron microscopy appears as particles of extremely small average diameter. It is preferred that the average diameter of the particles be as small as possible, with the preferred diameter being less than about 5 microns. Most preferably, the particle diameter is less than about 2 microns. The particle size of the disperse phase is much smaller than would be expected from the large difference in the solubility parameters of the individual components of the polyblend.

Without wishing to be bound by any particular theory, it is believed that partial miscibility or compatibilization of the polyamide and thermoplastic copolymer, resulting in the excellent overall balance of properties possessed by the polyblends, is achieved by chemical reaction of the amine end-groups of the polyamide with the acid functionality of the thermoplastic copolymer. The polyamide may undergo limited degradation and chain scission during blending to create additional amine groups available for reaction with the acid functionality. The chemical reaction is thought to yield a graft copolymer in which polyamide segments appear as side-chains on a backbone of thermoplastic copolymer.

The superior impact properties of the polyblends of this invention, as compared to blends of polyamides and styrene/unsaturated carboxylic acid copolymers alone, are believed to be due to chemical reaction of the amine groups of the polyamide with the carboxylic acid anhydride groups of the functionalized elastomer. The compatibilization which results from this grafting helps to ensure that the elastomeric polymer is well-dispersed throughout the polyblend matrix and is at least partially compatibilized with the matrix, thereby functioning effectively as an impact modifier.

However, the polyblends of this invention can include not only the graft copolymers described above, but also varying amounts of ungrafted polyamide, ungrafted functionalized elastomer, and ungrafted thermoplastic copolymer. The relative amounts of the graft copolymer, unreacted polyamide resin, and unreacted thermoplastic copolymer will depend on the component molecular weights, the chemical composition of the components, and blending temperature and shear rate, among other factors. In general, however, it is desirable to achieve a high proportion of the graft copolymer in the blend.

The polyamide resin may constitute from about 9 to 94 weight percent, more preferably from about 40 to 70 weight percent, of the total polyblend of this invention. Any polyamide is suitable for use in the practice of this invention, provided it has a number average molecular weight of at least about 8,000. Aliphatic polyamides are preferred. It is preferred that the polyamide have an average of at least 0.5 amine end-group per chain. The preferred molecular weight range is from about 10,000 to 40,000. Suitable polyamides include nylon-6, nylon-6,6, nylon-6,9, nylon-6,10, nylon-6,12, nylon-11, nylon-12 and mixtures thereof. Nylon-6 (polycaprolactam) is a preferred polyamide resin. The polyamide resins may be prepared by any of the methods familiar to those skilled in the art, including the condensation of diamines and diacid chlorides, the condensation of diamines and dicarboxylic acids, and the ring-opening polymerization of lactams.

The polyblends of this invention are comprised of from about 5 to 90 weight percent, preferably about 15 to 45 weight percent, of a thermoplastic copolymer. The thermoplastic copolymer preferably contains from about 1 to 30 weight percent of an unsaturated carboxylic acid, from about 50 to 99 weight percent of a vinyl aromatic monomer, and, optionally, up to about 40 weight percent of an unsaturated monomer. The unsaturated monomer is selected from the group consisting of unsaturated dicarboxylic acid imides, unsaturated nitrile monomers, and unsaturated carboxylic acid esters. The unsaturated carboxylic acid is most preferably incorporated in a random fashion into the thermoplastic copolymer.

The unsaturated carboxylic acids suitable for incorporation into the thermoplastic copolymer component of this invention are preferably $C_3-C_8$ $\alpha,\beta$-unsaturated aliphatic monocarboxylic acids such as acrylic acid, methacrylic acid, crotonic acid, 2-pentenoic acid, angelic and tiglic acid. Unsaturated dicarboxylic acids such as maleic acid, fumaric acid, itaconic acid, and citraconic acid may also be used, either alone or in combination with unsaturated monocarboxylic acids. Methacrylic acid is the preferred unsaturated carboxylic acid. It is preferred that the thermoplastic copolymer contain from about 1 to 15 weight percent of the unsaturated carboxylic acid as optimum properties, particularly impact strength, are obtained at these relatively low levels of acid. The presence of greater amounts of acid tends to result in cross-linking, lower mechanical strength, and poorer impact properties, although this can be partially compensated for by carrying out the blending under conditions such that a lower degree of chemical reaction and grafting takes place between the polyamide and the thermoplastic copolymer.

The thermoplastic copolymer is additionally comprised of at least one vinyl aromatic monomer copolymerizable with the unsaturated carboxylic acid. Suitable vinyl aromatic monomers include such as styrene, alpha-methylstyrene, ethylstyrene, isopropylstyrene, tert-butylstyrene, vinyl naphthalene, and their mixtures. Styrene is the preferred vinyl aromatic monomer. Unsaturated nitriles such as acrylonitrile and methacrylonitrile, unsaturated carboxylic acid esters, especially $C_1-C_6$ alkyl esters of acrylic acid and methacrylic acid such as methyl methacrylate and n-butyl acrylate, may also be used in addition to the vinyl aromatic monomer. Unsaturated dicarboxylic acid imide derivatives such as n-phenylmaleimide and maleimide are also useful as comonomers. In contrast to the unsaturated carboxylic acid repeating units, the imide derivatives do not appear to chemically react with the polyamide resin component when incorporated into the thermoplastic polymer blends of this invention. Good compatibilization, small disperse particle size, and good impact properties are not achieved if the thermoplastic copolymer contains imide but not acid. However, the presence of imide together with acid can improve certain properties of the final polyblend, such as stiffness and heat distortion temperature.

The preferred thermoplastic copolymers of this invention are styrene/methacrylic acid copolymers containing from about 1 to 15 weight percent acid. Particularly suitable for use are the high molecular weight copolymers of styrene and methacrylic acid designated as "Ryulex" copolymers, commercially available from Dainippon Ink and Chemicals Company.

The thermoplastic copolymers may be prepared by any of the several methods available for their synthesis. For example, the copolymers may be obtained by solution copolymerization directly from the respective monomers as described in U.S. Pat. Nos. 3,035,033, 4,275,182, 2,967,855, and 4,195,169, Jpn. Kokai No. 62-95-305, and EP Appl. 333,440. Alternatively, a suspension polymerization process as taught in U.S. Pat. Nos. 4,656,112, 4,631,307 and 3,839,308 and Jpn. Kokai No. 60-168,709 may be employed. The teachings of all these patents are incorporated herein by reference. The number average molecular weight of the thermoplastic copolymer is at least about 30,000, and preferably is less than about 500,000.

The thermoplastic copolymer can be impact-modified using any art-recognized method of incorporating one or more rubber impact modifiers. Typically, such impact modifiers are polymers which are elastomeric in nature and which have glass transition temperatures below 0° C. (preferably, below −30° C.). Examples of suitable impact modifiers include butadiene rubber, ethylene-propylene-diene monomer (EPDM) rubber, butadiene-acrylonitrile rubber, butadiene-styrene rubber, isoprene rubber, isoprene-styrene rubber, and block copolymers of butadiene-styrene. Preferably, the impact modifiers are incorporated into the thermoplastic copolymer monomer mixture prior to polymerization in order to chemically graft the impact modifier onto the thermoplastic copolymer. The methods described in U.S. Pat. Nos. 3,657,395, and 4,631,307 and Jpn. Kokai No. 62-95,305 (incorporated herein by reference) are exemplary.

The use of thermoplastic copolymer which is impact-modified is optional, as the impact properties of the polyblends of this invention are influenced more by the amount and type of functionalized elastomer used. It is preferred that the thermoplastic copolymer contain between about 2 and 25 parts by weight rubber per 100 parts thermoplastic copolymer if it is rubber-modified.

The functionalized elastomer may constitute from about 1 to 30 weight percent of the total polyblend of the invention, with 10 to 20 weight percent being the preferred range. The functionalized elastomers suitable for use in the moldable polyblends of this invention are relatively soft, rubber-like polymers containing at least one pendent carboxylic acid anhydride group per polymer chain which provides a potential grafting site for reaction with a polyamide amine end-group. The anhydride group is preferably pendent and not incorporated as a monomer unit in the backbone of the elastomeric polymer. To function effectively as an elastomer, this component should have a glass transition temperature less than 0° C.; more preferably, the glass transition temperature should be less than −40° C. The molecular weight of the functionalized elastomer should be sufficiently high so as to provide adequate elastomeric properties. In most instances, the number average molecular weight will preferably be above about 30,000. The functionalized elastomers should contain a minimum of cross-linking or gel in order to facilitate processing of the polyblends of this invention. Some degree of branching may be desirable, however.

A particular advantage of this invention is that the functionalized elastomers used contain relatively low levels of unsaturation, as compared to, for example, elastomers containing substantial amounts of butadiene. The presence of low levels of unsaturation results in the polyblends of this invention having excellent weather resistance, particularly with respect to oxidation.

The $\alpha,\beta$-unsaturated carboxylic acid anhydrides suitable for use in preparing the adducts to be used in the polyblends of this invention are those anhydrides which may be grafted onto the random copolymer to provide amine-reactive functional groups. A particularly preferred anhydride is maleic anhydride, although other anhydrides such as citraconic anhydride, itaconic anhydride, tetrahydrophthalic anhydride, chloromaleic anhydride, and ethyl maleic anhydride may also be employed. It is desirable that the anhydride constitute from about 0.5 to 5 weight percent of the adduct.

In one embodiment, the functionalized elastomer may be an adduct of an $\alpha,\beta$-unsaturated carboxylic acid anhydride and a random copolymer of ethylene, at least one $C_3$ to $C_6$ $\alpha$-olefin, and at least one diene. This type of random terpolymer is the type generally referred to in the art as "EPDM" rubber. The $\alpha$-olefin is preferably propylene, for reasons of availability, but may also be 1-butene, 1-pentene, 1-hexene or mixtures thereof. The diene suitable for use in preparing the random copolymer can be a conjugated diene such as 1,3-butadiene or isoprene, but more preferably may be a nonconjugated diene. The nonconjugated diene may be a linear aliphatic diene of at least six carbon atoms which has either two terminal double bonds or one terminal double bond and one internal double bond. Alternatively, the nonconjugated diene may be a cyclic diene wherein one or both of the double bonds are part of a carboxcyclic ring. The structure of the copolymer may be altered as desired, particularly with respect to branching, by the selection of particular nonconjugated dienes as is well known to those skilled in the art. Particularly preferred nonconjugated dienes include 1,4-hexadiene, dicyclopentadiene, and 5-ethylidene-2-norbornene.

In this embodiment, it is preferred that the random copolymer contain from about 40 to 90 mole percent ethylene and 0.1 to 7.5 mole percent diene, with the remainder being propylene.

The adducts of $\alpha,\beta$-unsaturated carboxylic acid anhydrides and random copolymers of ethylene, at least one $C_3$ to $C_6$ $\alpha$-olefin, and at least one diene which are suitable for use in the polyblends of this invention may be prepared by any of the methods well-known to those skilled in the art. U.S. Pat. Nos. 3,884,882 and 4,010,223, and European Pat. Appl. No. 353,720 incorporated herein by reference, teach the preparation of such adducts by thermally reacting maleic anhydride and EPDM type rubbers. Examples of suitable functionalized elastomers of this type are Uniroyal "ROYALTUF 465" and Uniroyal "ROYALTUF 465A", which are maleated-EPDM rubbers containing about 1.2 and 0.7 weight percent maleic anhydride respectively.

In another embodiment, the functionalized elastomer is an adduct of an $\alpha,\beta$-unsaturated carboxylic acid anhydride and a hydrogenated block copolymer wherein at least two blocks consist essentially of recurring units of at least one monovinyl aromatic monomer and at least one other block consists essentially of recurring units of a conjugated diene. The monovinyl aromatic monomer is most preferably styrene, but may be any other similar monomer such as $\alpha$-methylstyrene, p-methylstyrene, p-ethylstyrene, p-tert-butyl styrene or p-chlorostyrene. Suitable conjugated dienes include butadiene and isoprene.

The 1,2-microstructure content of the conjugated diene block may be from about 7 to 100%. The block copolymer may contain up to 60 percent by weight of monovinyl aromatic monomer; higher monovinyl aromatic monomer content may yield block copolymers which are not sufficiently elastomeric.

The block copolymer is hydrogenated in order to reduce the level of unsaturation due to the conjugated diene block to less than 20 percent of the original value before hydrogenation. As discussed previously, the low levels of unsaturation provide the final polyblend with a high degree of resistance toward oxidative degradation.

The blocks of recurring monovinyl aromatic monomer units constitute relatively hard segments having a glass transition temperature or melting temperature above ambient while the block of conjugated diene is a relatively soft rubbery segment having a glass transition temperature below ambient. The block copolymer is thus a thermoplastic elastomer.

The adducts of $\alpha,\beta$-unsaturated carboxylic acid anhydrides and hydrogenated block copolymers of monovinyl aromatic compounds and conjugated dienes suitable for use as functionalized elastomers in the polyblends of this invention may be prepared by any of the methods known in the art. U.S. Pat. No. 4,427,828, incorporated herein by reference, teaches the preparation of such adducts by thermally grafting the anhydride onto the hydrogenated block copolymer using an "ene"-type reaction. U.S. Pat. No. 4,578,429, incorporated herein by reference, teaches that similar adducts may also be obtained by free radical induced grafting. In this method, the resulting adducts are more thermally stable than the adducts of U.S. Pat No. 4,427,828 due to the type of grafting which occurs. In addition, the functionalized hydrogenated block copolymers produced by free radical grafting may contain even lower levels of unsaturation since the presence of double bonds in the block copolymer is not required by this type of grafting mechanism. "Kraton FG1901X", a maleated block copolymer sold commercially by Shell which contains ca. 2 wt. % maleic anhydride, is an example of a suitable functionalized elastomer of this type. Such materials are sometimes referred to as functionalized styrene-ethylene/1-butene-styrene (S-E/B-S) rubbers, as the structure of the butadiene center block after hydrogenation resembles that of an ethylene/1-butene copolymer.

In another embodiment of this invention, the functionalized elastomer is an adduct of an $\alpha,\beta$-unsaturated carboxylic acid anhydride and a hydrogenated random copolymer of at least one monovinyl aromatic monomer and at least one conjugated diene. Styrene is the preferred monovinyl aromatic monomer and preferably does not represent more than about 60 mole percent of the random copolymer in order that the glass transition temperature not be increased past the point at which the random copolymer would no longer function effectively as an elastomer. Other monovinyl aromatic monomers may be employed, however, including $\alpha$-methyl styrene, o- or p-methylstyrene, p-tert-butylstyrene, p-chlorostyrene, vinyl naphthalene, and the like or mixtures thereof. Suitable conjugated dienes include 1,3-butadiene, isoprene, 1,3-pentadiene, 2,3-dimethyl-1,3-butadiene and similar compounds, with 1,3-butadiene being the preferred diene. The random copolymer is hydrogenated to lower the unsaturation level to less than 20 percent of the original value. The 1,2-microstructure content of the random copolymers prior to hydrogenation can vary from about 10 to 100 percent. The preparation of adducts of this type is taught in U.S. Pat. No. 4,427,828, which teaches that random copolymers of conjugated dienes and monovinyl aromatic monomers may be functionalized with $\alpha,\beta$-unsaturated carboxylic acid anhydrides in a thermal "ene"-type reaction. The teachings of this patent are incorporated herein by reference. Other methods of preparing such adducts will be well-known to those skilled in the art.

In yet another embodiment of this invention, a functionalized elastomer is employed which is an adduct of an $\alpha,\beta$-unsaturated carboxylic acid anhydride and a hydrogenated polymer of at least one conjugated diene. The diene polymer is hydrogenated to an extent such that less than 20 percent of the original unsaturation remains. The diene may be any hydrocarbon containing two conjugated double bonds such as 1,3-butadiene, which is the preferred diene. Examples of other suitable dienes include isoprene, 2,3-dimethyl-1,3-butadiene, 1,3-pentadiene, and the like. Mixtures of dienes may also be employed. Polymers of conjugated dienes which may be utilized include those containing prior to hydrogenation a total of about 0.1 to 100 percent 1,2- and 3,4-microstructure content and about 0.1 to 99 percent 1,4-microstructure. It is preferred that the 1,2-microstructure content be from about 40 to 60 percent. "Ene"-type thermal grafting may be used to form adducts of this type, as described in U.S. Pat. No. 4,427,828 (incorporated by reference). Other synthetic routes to such adducts will be apparent to those familiar with the art.

The moldable multi-phase polyblends of this invention can be prepared by blending in the melt the polyamide resin, thermoplastic copolymer, and the anhydride functionalized elastomer. It is desirable to carry out such blending under conditions which promote chemical grafting of the polyamide resin onto the thermoplastic copolymer through the acid groups of the copolymer and the anhydride groups of the functionalized elastomer. Intimate and thorough mixing is thus preferred. The melt-blending can be effected using a conventional melt-kneading or compounding apparatus for resins such as a kneader, Banbury mixer, or twin or single screw extruder. The blending may be carried out at a temperature of between 240° C. and 330° C., preferably 260° C. to 310° C. Higher temperatures may result in excessive decomposition, while the desired degree of grafting and compatibilization may not be realized at lower temperatures. It is preferred to carry out the blending under vacuum in order to remove any water formed during reaction of the acid groups in the thermoplastic copolymer and the anhydride groups in the functionalized elastomer.

In a preferred method for the preparation of the moldable thermoplastic polymer blends of this invention, the polyamide and the functionalized elastomer and, optionally, a minor portion of the thermoplastic copolymer are melt-blended to form a first blend composition. The first blend composition is then melt-blended with the remainder of the thermoplastic copolymer to form the final moldable polymer blend. The amount of the first portion of the thermoplastic copolymer is no greater than the amount of the second portion of the thermoplastic copolymer. Preferably, however, the first portion is no greater than about 50 percent by weight of the second portion. For reasons which are not well understood, this procedure results in significantly improved low temperature impact properties as compared to the properties obtained if all of the components are blended in a single step.

Each step of the blending procedure may be carried out at a temperature of between about 240° C. and 330° C., preferably 260° C. to 310° C. The blending time required in each step will vary depending on the temperature, the blend composition, and the degree of shear present, among other factors, but will typically be from about 10 seconds to 30 minutes.

The polyblends of this invention may be produced by preblending the polyamide and functionalized elastomer (and, optionally, a minor portion of the thermoplastic copolymer). The preblend, which can be in the form of pellets, for example, is then melt-blended with the remaining components of the thermoplastic resin composition. The process of this invention may also be conveniently carried out using a single pass through an extruder. The polyamide and the functionalized elastomer (and the first portion of the thermoplastic copolymer, if any) are fed into the extruder at a first feed port and melt-blended before introduction of the thermoplastic copolymer at one or more downstream feed ports. The total residence time in the extruder will generally be from about 0.5 to 10 minutes.

In another preferred embodiment of the process of this invention, the polyamide is first melted and then melt-blended with the other components of the thermoplastic resin composition (the functionalized elastomer and the thermoplastic copolymer). This procedure may most conveniently be carried out using an extruder equipped with multiple feed ports. The polyamide is added through the first feed port; the other components are then introduced at one or more downstream feed ports to the molten polyamide. Processing temperatures are preferably from about 240° C. to 330° C. (more preferably, from about 260° C. to 310° C.).

The multi-phase polyblends of this invention may additionally include additives such as heat or light stabilizers, anti-oxidants, pigments, anti-static agents or fillers such as glass or carbon fibers. The polyblends may be employed in any application for which thermoplastic resins are normally used, including extrusion, injection or blow molding.

The following examples are meant to illustrate, but not limit, the invention. The evaluation of material properties was performed based on the following ASTM standard tests: flexural strength and modulus (D-790), tensile strength (D-638), notched Izod (D-256), DTUL (deflection temperature under load at 264 psi, D-648), and penetration impact (D-3763).

EXAMPLES 1-5

These examples demonstrate the preparation of the moldable thermoplastic polymer blends of this invention. The following blend methods and components were employed.

| | |
|---|---|
| Blend Method M-1: | The polyamide, functionalized elastomer and thermoplastic copolymer were extruded in a two stage, single screw Egan extruder in a single pass. |
| Blend Method M-2: | The polyamide and functionalized elastomer were melt-blended using a Welding Engineers counter-rotating non-intermeshing twin screw devolatizing extruder. The thermoplastic copolymer was then added to the molten polyamide/functionalized elastomer mixture at a downstream feed port. |
| Blend Method M-3: | The polyamide and functionalized elastomer were melt-blended and pelletized using a ZSK extruder. The pelletized mixture was then melt-blended with the thermoplastic copolymer using a Welding Engineers counter-rotating non-intermeshing twin screw devolatizing extruder. |
| Polyamides | |
| A-1: | "Nivionplast 273 MR", a nylon-6 polyamide available from Enichem. |
| A-2: | "Nivionplast 303 HV", a nylon-6 polyamide having a number average molecular weight of 28,000 and containing 0.041 meq $NH_2$/gram, available from Enichem. |
| Functionalized Elastomer | |
| B-1: | "Royaltuf 465", a maleated-EPDM rubber containing about 1.2 weight percent grafted maleic anhydride; available from Uniroyal. |
| Thermoplastic Copolymers | |
| C-1: | A styrene/methacrylic acid copolymer containing about 7 weight percent methacrylic acid prepared in powder form by suspension polymerization. |
| C-2: | "Ryulex A-11" styrenic/methacrylic acid copolymer estimated to contain about 10 weight percent methacrylic acid, available from Dainippon Ink and Chemicals Co. |

TABLE I

| EXAMPLE NO. | 1 | 2 | 3 | 4 | 5 |
|---|---|---|---|---|---|
| Polyamide | A-1 | A-1 | A-2 | A-2 | A-2 |
| pbw | 56 | 56 | 56 | 56 | 56 |
| Functionalized Elastomer | B-1 | B-1 | B-1 | B-1 | B-1 |
| pbw | 14 | 14 | 14 | 14 | 14 |
| Thermoplastic Copolymer | C-1 | C-2 | C-1 | C-2 | C-2 |
| pbw | 30 | 30 | 30 | 30 | 30 |
| Blending Method | M-1 | M-2 | M-1 | M-2 | M-3 |
| Tensile | | | | | |
| Yield Stress (ksi) | 8.2 | 8.1 | 8.2 | 8.5 | 8.9 |
| Break Strain (%) | 20 | 30 | 22 | 21 | 30 |
| Flex | | | | | |
| Modulus (ksi) | 330 | 315 | 370 | 357 | 360 |
| Yield Stress (ksi) | 13.7 | 12.7 | 15.2 | 13.9 | 14.6 |
| DTUL (°F.) | | | | | |
| Instrument Impact | | | | | |
| T = 73° C. | | | | | |
| Max. Load (lb) | 1110 | 1016 | 788 | 1013 | 1070 |
| Total Energy (ft-lb) | 53 | 42 | 10 | 43 | 45 |
| T = −20° F. | | | | | |
| Max. Load (lb) | 227 | 1260 | 332 | 1197 | 1026 |
| Total Energy (ft-lb) | 2.2 | 26 | 2.0 | 16 | 18 |
| T = −40° F. | | | | | |
| Max. Load (lb) | — | 1297 | — | 723 | 660 |
| Total Energy (ft-lb) | — | 30 | — | 7 | 6 |
| Notched Izod (ft-lb/in) | | | | | |

TABLE I-continued

| EXAMPLE NO. | 1 | 2 | 3 | 4 | 5 |
|---|---|---|---|---|---|
| T = 73° F. | 1.8 | 6.6 | 1.4 | 4.1 | 7.5 |
| T = −20° F. | 1.7 | 2.2 | 0.99 | 2.4 | 2.6 |
| T = −40° F. | — | 2.0 | — | 2.1 | 2.4 |

EXAMPLES 6-9

The preparation of moldable thermoplastic polymer blends containing various polyamides, functionalized elastomers, and thermoplastic copolymers in varying proportions is illustrated by these examples. The following blend methods and components are employed.

| | |
|---|---|
| Blend Methods M-1, M-2, M-3: | See Examples 1-5 |
| Blend Method M-4: | The procedure described above for Blend Method M-2 is followed, except that 10 parts by weight thermoplastic copolymer is initially blended with the polyamide and functionalized elastomer. The remaining thermoplastic copolymer (28 parts by weight) is then added through a downstream feed port. |
| A-3: | "Zytel 151 LNC-10" polyamide, a nylon-6,12 available from E. I. duPont de Nemours. |
| A-4: | "Vestamid L 1901" polyamide, a nylon-12 available from Huls America. |
| A-5: | "BMNO P40" polyamide, a nylon-11 available from Atochem. |
| A-6: | "Zytel 101" polyamide, a nylon-6,6 available from E. I. duPont de Nemours. |
| Functionalized Elastomers | |
| B-2: | Shell Chemical "Kraton FG 1901X" maleic anhydride functionalized hydrogenated styrene/butadiene block copolymer containing 2 weight percent maleic anhydride and 28 weight percent polymeric styrene. |
| B-3: | Hydrogenated styrene/butadiene block copolymer containing about 0.5 weight percent grafted maleic anhydride and 29 weight percent polymeric styrene and having a molecular weight of about 54,000; prepared in accordance with Examples 1-5 of U.S. Pat. No. 4,795,782. |
| B-4: | Maleic anhydride functionalized EPHD rubber prepared in accordance with Example 1 of U.S. Pat. No. 3,884,882; maleic anhydride content about 2 weight percent; inherent viscosity about 1.5; monomer composition of EPHD rubber, 61.4 weight percent ethylene, 32 weight percent ethylene, and 6.6 weight percent 1,4-hexadiene. |
| B-5: | Hydrogenated maleic anhydride functionalized, polybutadiene prepared in accordance with Example 1 of U.S. Pat. No. 4,427,828; $M_w$ 170,000; maleic anhydride content about 5 weight percent. |
| Thermoplastic Copolymers | |
| C-3: | A styrene/ethyl acrylate/acrylic acid terpolymer containing 58.3 weight percent styrene, 35 weight percent ethyl acrylate, and 6.7 weight percent acrylic acid, prepared in accordance with Example 3 of U.S. Pat. No. 2,967,855. |
| C-4: | A styrene/methacrylic acid copolymer containing 5.6 weight percent methacrylic acid, prepared in accordance with Example 8 of U.S. Pat. No. 4,195,196. |
| C-5: | A styrene/methyl methacrylate/methacrylic acid terpolymer containing 48 weight percent styrene, 35 weight percent methyl methacrylate, and 17 weight percent methacrylic aid and 6 parts by weight per 100 parts by weight terpolymer of a styrene-butadiene rubber (30% styrene), prepared in accordance with Example 6 of Jpn. Pat. No. 62-95-305. |
| C-6: | A styrene/methacrylic acid copolymer containing 89 weight percent styrene and 11 weight percent methacrylic acid and 8.7 parts by weight per 100 parts by weight copolymer of a polybutadiene rubber, prepared in accordance with Example 3 of U.S. Pat. No. 4,631,307. |

TABLE II

| EXAMPLE NO. | 6 | 7 | 8 | 9 |
|---|---|---|---|---|
| Polyamide | A-3 | A-4 | A-5 | A-6 |
| pbw | 70 | 45 | 65 | 50 |
| Functionalized Elastomer | B-2 | B-3 | B-4 | B-5 |
| pbw | 10 | 10 | 15 | 18 |
| Thermoplastic Copolymer | C-3 | C-4 | C-5 | C-6 |
| pbw | 15 | 45 | 20 | 32 |
| Blending Method | M-3 | M-4 | M-2 | M-3 |

I claim:
1. A process for producing a moldable thermoplastic polymer blend having enhanced low temperature impact properties comprising the steps of:
(A) forming a first blend composition by melt-blending at a temperature of from 240° C. to 330° C. and for a time of from 10 seconds to 30 minutes
   (i) a polyamide having a number average molecular weight of at least about 8,000;
   (ii) a functionalized elastomer which is an adduct of an α, β-unsaturated carboxylic acid anhydride and an elastomeric polymer selected from the group consisting of:
      (a) a random copolymer of ethylene, at least one $C_3$ to $C_6$ α-olefin, and at least one nonconjugated diene,
      (b) a block copolymer wherein at least two blocks consist essentially of recurring units of at least one monovinyl aromatic monomer and at least one other block consists essentially of recurring units of at least one conjugated diene, and wherein said other block is substantially hydrogenated such that the unsaturation level of said other block is less than 20 percent of the original unsaturation level;
      (c) a random copolymer of at least one monovinyl aromatic monomer and at least one conjugated diene, wherein said random copolymer is substantially hydrogenated such that the unsaturation level of said random copolymer is less than 20 percent of the original unsaturation level; and
      (d) a conjugated diene polymer, wherein said conjugated diene polymer consists of a conjugated diene or a mixture of conjugated dienes and is substantially hydrogenated such that the unsaturation level of said polymer is less than 20 percent of the original unsaturation level; and
   (iii) optionally, a first portion of a thermoplastic copolymer comprised of from about 1 to 30 weight percent based on thermoplastic copolymer of an α,β-unsaturated carboxylic acid, from about 50 to 99 weight percent based on thermoplastic copolymer of a monovinyl aromatic monomer, and up to about 40 weight percent of an unsaturated monomer selected from the group consisting of unsaturated dicarboxylic acid imides, unsaturated nitrile monomers, and unsaturated carboxylic acid esters, said thermoplastic copolymer having a number average molecular weight of at least about 30,000 wherein said melt-blending is carried out under conditions effective to promote chemical grafting of the polyamide and the functionalized elastomer; and (B) melt-blending said first blend composition and a second portion of the thermoplastic copolymer under vacuum with removal of water at a temperature of from 240° C. to 330° C. and for a time of from 10 seconds to 30 minutes, with the proviso that the amount of the first portion of the thermoplastic copolymer is no greater than the amount of the second portion of the thermoplastic copolymer, wherein said melt-blending is carried out under conditions effective to promote chemical grafting of the polyamide and the thermoplastic copolymer.

2. The process of claim 1 wherein the resulting moldable polymer blend is comprised of from about 9 to 94 weight percent of the polyamide, from about 5 to 90 weight percent of the thermoplastic copolymer, and from about 1 to 30 weight percent of the functionalized elastomer.

3. The process of claim 1 wherein the polyamide is selected from the group consisting of nylon-6, nylon-6,6, nylon-6,12, nylon-6-10, nylon-11, and nylon-12.

4. The process of claim 1 wherein the α,β-unsaturated carboxylic acid in the thermoplastic copolymer is selected from the group consisting of acrylic acid and methacrylic acid.

5. The process of claim 1 wherein the vinyl aromatic monomer in the thermoplastic copolymer is styrene.

6. The process of claim 1 wherein the thermoplastic copolymer is a styrene/methacrylic acid copolymer.

7. The process of claim 1 wherein melt-blending steps (A) and (B) are performed at a temperature of from about 260° C. to 310° C.

8. A process for producing a moldable polymer blend having enhanced low temperature impact properties comprising the steps of:
(A) forming a first blend composition by melt-blending at a temperature of from about 240° C. to 330° C. and for a time of from 10 seconds to 30 minutes:
 (i) nylon-6 having a number average molecular weight of at least about 8,000;
 (ii) a functionalized elastomer which is an adduct of maleic anhydride and an elastomeric polymer selected from the group consisting of:
  (a) a random copolymer of ethylene, propylene, and at least one nonconjugated diene selected from the group consisting of 1,4-hexadiene, 5-ethylidene-2-norbornene, and dicyclopentadiene
  (b) a block copolymer wherein at least two blocks consist essentially of recurring units of styrene and at least one other block consists essentially of recurring units of butadiene, and wherein said other block is substantially hydrogenated such that the unsaturation level of said other block is less than 20 percent of the original unsaturation level;
  (c) a random copolymer of styrene and butadiene, wherein said random copolymer is substantially hydrogenated such that the unsaturation level of said random copolymer is less than 20 percent of the original unsaturation level; and
  (d) a polymer of butadiene, wherein said polymer consists of butadiene and is substantially hydrogenated such that the unsaturation level of said polymer is less than 20 percent of the original unsaturation level wherein said melt-blending is carried out under conditions effective to promote chemical grafting of the nylon-6 and the functionalized elastomer; and
(B) melt-blending under vacuum with removal of water for a time of from 10 seconds to 30 minutes at a temperature of from about 240° C. to 330° C. said first blend composition and a thermoplastic copolymer of from about 70 to 99 weight percent styrene and from about 1 to 30 weight percent of an unsaturated carboxylic acid selected from the group consisting of methacrylic acid and acrylic acid and having a number average molecular weight of at least about 30,000, wherein said melt-blending is carried out under conditions effective to promote chemical grafting of the nylon-6 and the thermoplastic copolymer;

and wherein the resulting moldable polymer blend contains from about 40 to 70 weight percent of the nylon-6, from about 15 to 45 weight percent of the thermoplastic copolymer, and from about 10 to 20 weight percent of the functionalized elastomer and step (A) is performed in the absence of any of the thermoplastic copolymer.

* * * * *